United States Patent
Ando

(10) Patent No.: US 6,275,552 B1
(45) Date of Patent: Aug. 14, 2001

(54) METHOD AND SYSTEM FOR DATA COMMUNICATIONS USING SYNCHRONIZING SIGNALS OF DIFFERENT DATA LENGTH

(75) Inventor: Toshihide Ando, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/019,362

(22) Filed: Feb. 5, 1998

(30) Foreign Application Priority Data

Feb. 14, 1997 (JP) .................................................. 9-030477

(51) Int. Cl.⁷ ...................................................... H04L 7/00
(52) U.S. Cl. ........................ 375/368; 375/364; 375/365; 340/905; 455/447
(58) Field of Search .................................... 375/368, 273, 375/365, 364; 370/273, 321, 324, 350, 513; 340/928, 905, 937; 455/447

(56) References Cited

U.S. PATENT DOCUMENTS

| 3,641,274 | * | 2/1972 | Sasaki et al. | 370/324 |
| 4,847,877 | * | 7/1989 | Besseyre | 375/368 |
| 5,450,451 | * | 9/1995 | Isozaki | 375/273 |
| 5,550,831 | * | 8/1996 | Tanahashi | 370/321 |
| 5,550,833 | * | 8/1996 | Fujisawa | 370/514 |
| 5,952,940 | * | 9/1999 | Matsumoto | 340/905 |

FOREIGN PATENT DOCUMENTS

| 5-160826 | 6/1993 | (JP) . |
| 7-240742 | 9/1995 | (JP) . |
| 8-32631 | 2/1996 | (JP) . |

OTHER PUBLICATIONS

ISO TC204 WG15 Committee of Japan ISO WG15 DSRC L2 Draft (Dec. 20, 1996).

DRSC Protocol Summary, (WG15–DENPA–13–10, Hei8 (1996) Nov. 15.

DSRC Protocol Technical Document (WG15–DENPA–13–11, Hei8 (1996) Nov. 15.

* cited by examiner

Primary Examiner—Stephen Chin
Assistant Examiner—Shuwang Liu
(74) Attorney, Agent, or Firm—Pillsbury Winthrop LLP

(57) ABSTRACT

A road side communication equipment is provided crossing over lanes of an expressway, so that a communication processing for toll collection is executed between the road side equipment and an on-board equipment passing a communication area. The road side equipment sends signals using a 32-bit synchronizing signal for the start slot of each frame and a 16-bit synchronizing signal for subsequent slots of the frame. The on-board equipment receives this to perform signal receiving processing. The received communication signals are then digital-demodulated and entered to a shift register, so that the bit pattern is compared in two comparators to detect the synchronizing signal. According to the output from AND circuits, the synchronizing signal is distinguished from the synchronizing signal to determine the received data and receive subsequent data.

19 Claims, 10 Drawing Sheets

FIG. 3
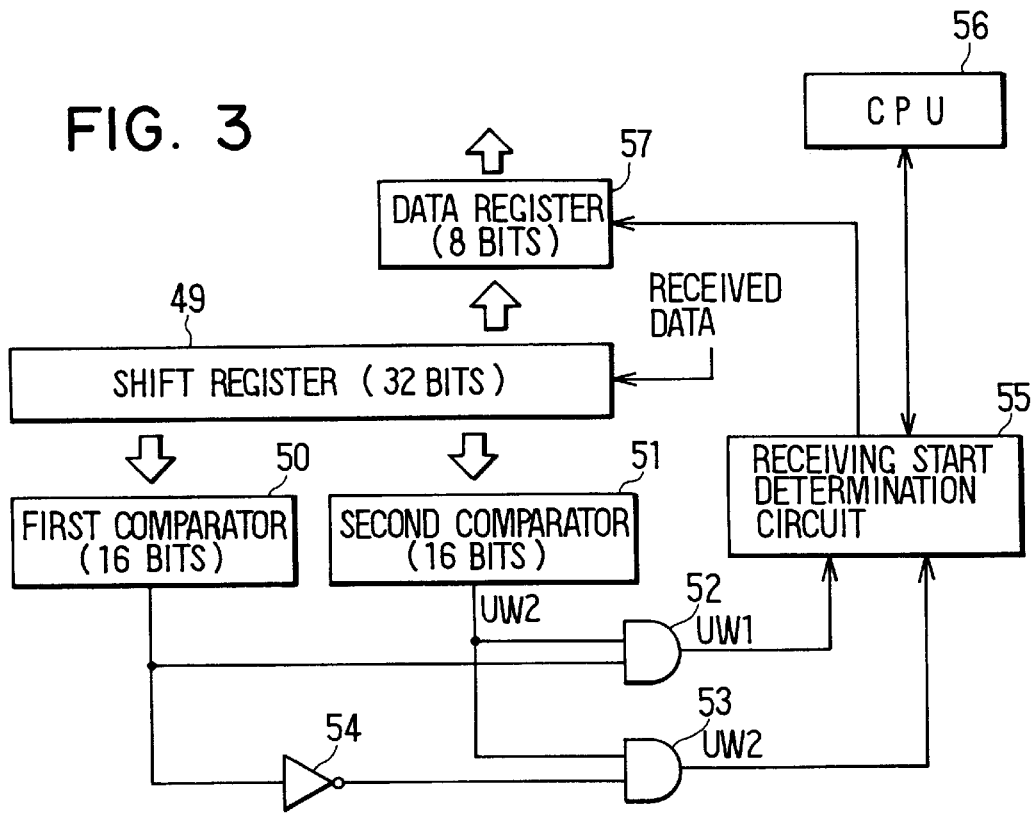
FIG. 4A
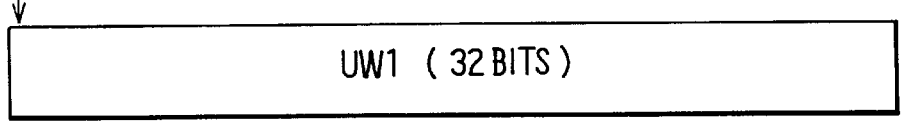
FIG. 4B
```
UW1   0111 1100 1101 0010 0001 0101 1101 1000
UW2                    10 0001 0101 1101 1000
```

METHOD AND SYSTEM FOR DATA COMMUNICATIONS USING SYNCHRONIZING SIGNALS OF DIFFERENT DATA LENGTH

CROSS REFERENCE TO RELATED APPLICATION

This application relates to and incorporates herein by reference Japanese Patent Application No. 9-30477 filed on Feb. 14, 1997.

BACKGROUND OF THE INVENTION

1. Field of the Invention

This invention relates to a method for data communications, an on-board communication equipment and a road side communication equipment, which use synchronizing signals as communication signals for sending communication data and process subsequent communication data according to the synchronizing signals included in received communication signals.

2. Description of Related Art

In a communication system, for example, a transmitter and a receiver are synchronized to send and receive signals by adding a synchronizing signal to the start of each transmission signal. In this case, therefore, the data length of the synchronizing signal must be set as long as possible to prevent influences of external noises and ensure communications in wireless communications. Setting a longer data length for communications, however, causes the communication time to be extended according to the surplus data length. This also becomes a disadvantage for communications when the communication time is limited as described below.

Such a disadvantage occurs in communications between an on-board communication equipment mounted in a vehicle such as a car and a road side communication equipment provided in a communication area on a road when the vehicle passes the communication area. For example, there is an automatic system for data communication, wherein each vehicle is provided with an on-board communication equipment and the road (eg., a tollgate on an expressway) is provided with an antenna so that the vehicle can pay the traffic fee to be decided by traffic section automatically through a wireless communication processing executed when the vehicle passes under the road side communication equipment. Construction of such a communication system expects advantages of reducing the personnel expenses for collecting traffic fee, the number of processes for the work, as well as to eliminate traffic jams at the tollgate, since vehicles are not required to stop at the tollgate any longer. Under the above circumstance, therefore, a communication processing for collecting traffic fee must be completed assuredly within a short time while the on-board equipment of the object vehicle passes the communication area of the antenna.

In order to solve the above problems and complete the communication processing assuredly, there is also a communication system which uses a plurality of synchronizing signals, each of which has a data length different from each other. In this instance, the following configuration shown in FIG. 16 may be considered for identifying synchronizing signals. In this configuration, a first synchronizing signal UW1 (Unique Word 1) of 32 bits (4 octets) and a second synchronizing signal UW2 (Unique Word 2) of 16 bits (2 octets) are set as defined below as two types of synchronizing signals having different data lengths from each other.

| UW1 | 0111 | 1100 | 1101 | 0010 | 0001 | 0101 | 1101 | 1000 |
|-----|------|------|------|------|------|------|------|------|
| UW2 | 1001 | 0010 | 1000 | 0111 |      |      |      |      |

A shift register 1 is used to hold 32-bit data. When receiving digital signals as received data, the signals are shifted sequentially in the register 1. Each bit data in the shift register 1 is connected to each input terminal of the comparator 2. The comparator 2 outputs a detection signal when the input data has the same bit pattern as that of the synchronizing signal UW1. A 16-bit comparator 3 is connected so that the input terminal receives the higher 16-bit data from the shift register 1. The comparator 3 outputs a detection signal when the input data has the same bit pattern as that of the synchronizing signal UW2.

When starting a communication, the UW1 having a longer data length is added to the signal indicating the start of the communication from a transmitter (not illustrated) before communication data is sent. This is to synchronize signals assuredly to send and receive data. The receiver, when receiving this start signal, enters received data that are demodulated to digital signals to the shift register 1. Then, when the first comparator 2 detects the synchronizing signal UW1 in the received data, the receiver starts another new communication according to the synchronizing signal UW1.

When a synchronized communication is started thus, the transmitter, when sending subsequent data, adds the synchronizing signal UW2 to the start of the communication signal to shorten the synchronizing time and sends subsequent signals and communication data continuously. Receiving the transmission signal, the receiver continues the communication according to the synchronizing signal UW2 if the synchronizing signal UW2 is included in the received data.

Thus, the synchronizing signal of the longer data length (32-bit) UW1 is used for determining the timing for the entire communication when the communication is started and the synchronizing signal of the shorter data length (16-bit) UW2 is used for determining timing of subsequent signals, so that the communication can be synchronized to send and receive data assuredly within a limited communication time, and accordingly the communication efficiency can be improved significantly.

When constructing a circuit for synchronizing the communication as described above, two comparators 2 and 3 are needed to detect each synchronizing signal UW1 and UW2 so as to identify each of synchronizing signals having different data lengths from each other. As a result, the number of bits necessary for forming such comparators is increased and accordingly, the following technical problems still remains for integrating those into a semiconductor integrated circuit; the circuit must be more simplified and reduced in size for mounting.

SUMMARY OF THE INVENTION

It is therefore an object of the present invention to provide a method for data communications, and a data communication system including an on-board communication equipment and a road side communication equipment using such method for data communications, which uses a plurality of synchronizing signals having data lengths different from each other and simplifies the configuration of a synchronizing signal detecting circuit.

According to the present invention, a plurality of synchronizing signals are used as communication signals. The synchronizing signals have data lengths different from each other. The bit pattern of the synchronizing signal having a shorter data length is included in the bit pattern of the synchronizing signal having a longer data length. Thus, a detecting circuit for detecting the synchronizing signal having the longer data length may be constructed by adding, to a detecting circuit for detecting the synchronizing signal having the shorter data length, a circuit for detecting the remaining bit pattern.

Preferably, the synchronizing signal having the shorter data length is set so as to include the last bit of the bit pattern of the synchronizing signal having the longer data length.

Preferably, an identification bit pattern comprising a specified number of bits is added to each synchronizing signal having the shorter data length so that the bit pattern of the shorter data length is distinguished from the synchronizing signal having the longer data length. When the shorter data length synchronizing signal is detected, the subsequent communication can be continued fast and accordingly, determination errors caused by noise, etc. can be prevented effectively.

Preferably, a transmitter of communication signals uses the synchronizing signal having the longer data length as a communication signal indicating the start of a new communication and uses the synchronizing signal having the shorter data length as a communication signal indicating the continuation of the communication respectively when sending data. The transmitter and a receiver of the communication data can be synchronized assuredly, as well as the subsequent communication can be synchronized fast. More preferably, the receiver of communication signals starts a communication processing according to the synchronizing signal having the longer data length detected in the received communication signals and continues the communication processing according to the synchronizing signal having the shorter data length detected in the subsequent communication signals.

BRIEF DESCRIPTION OF THE DRAWINGS

Other objects, features and advantages of the present invention will become more apparent from the following detailed description when read with reference to the accompanying drawings. In the drawings:

FIG. 3 is an electric wiring diagram of the major part of a receiver in the first embodiment shown in FIGS. 1 and 2;

FIGS. 4A and 4B are views showing the correspondence of the bit pattern between two synchronizing signals used in the first embodiment;

DETAILED DESCRIPTION OF THE PREFERRED EMBODIMENTS

Figure 1:
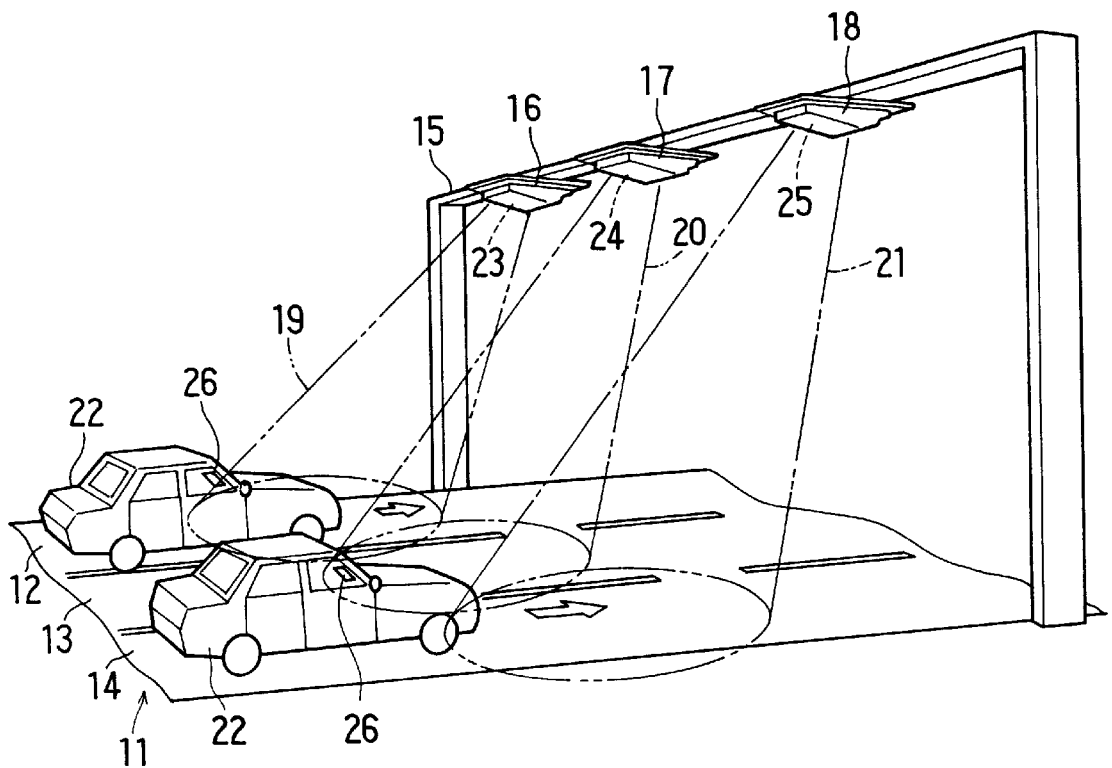
FIG. 1 is a schematic view of a data communication system showing road side equipment and on-board equipment to which the present invention is applied.

Hereunder, the present invention will be described with reference to various embodiments of the present invention. The same or similar parts are designated by the same or similar reference numerals throughout the embodiments.

(First Embodiment)

In FIG. 1 showing schematically the configuration of a tollgate system, an expressway (only one sided traffic lanes illustrated) 11 has three traffic lanes 12, 13, and 14 on one traffic side. At a specified tollgate point is arranged a gantry 15 used for each road side equipment (RSE) crossing over above the expressway 11. This gantry 15 is provided with antenna units 16 to 18 corresponding to the traffic lanes 12 to 14. The antenna units 16 to 18 are directed downward, so that each of them can set one of the communication areas 19 to 21.

Each of those communication areas 19 to 21 is formed from the antenna units 16 to 18 toward areas on the traffic lanes 12 to 14, into which cars (shown as 22 in the figure) comes in. In this embodiment, each of the antenna units 16 to 18 is provided with an antenna element (23 to 25). Each of the antenna units 16 to 18 is also provided with a control circuit 28 to 30 (FIG. 2) attached on the lower portion of the gantry 15 together with a corresponding antenna element (23 to 25), and those antenna units 16 to 18 are covered with water-proof resin that can transmit radio waves. Each control circuit is wired electrically (to be explained later), so that the control circuit can control driving each antenna element 23 to 25 for transmitting and receiving signals.

Each antenna element 23 to 25 is formed so as to be adjustable with respect to its radiating surface. The antenna element can thus adjust the set range of the corresponding communication area 19 to 21. In addition, each antenna element 23 to 25 is a micro-strip type array antenna formed by forming eight square patches (not illustrated) on one side surface of the printed-circuit board and connecting those patches to a power supply terminal via a transmission line.

Each of the cars 22 running on the expressway 11 is provided with an on-board equipment (OBE) 26 used as an on-board communication equipment arranged near the dashboard. Each on-board equipment 26 is provided with a corresponding antenna 27 (FIG. 2) used to receive and transmit communication signals from and to one of the antenna units 16 to 18 of the road side equipment. This antenna 27 is a micro-strip type formed by two square patches on one side surface of the same type printed-circuit board as that used for the antenna elements 23 to 25.

Figure 2:
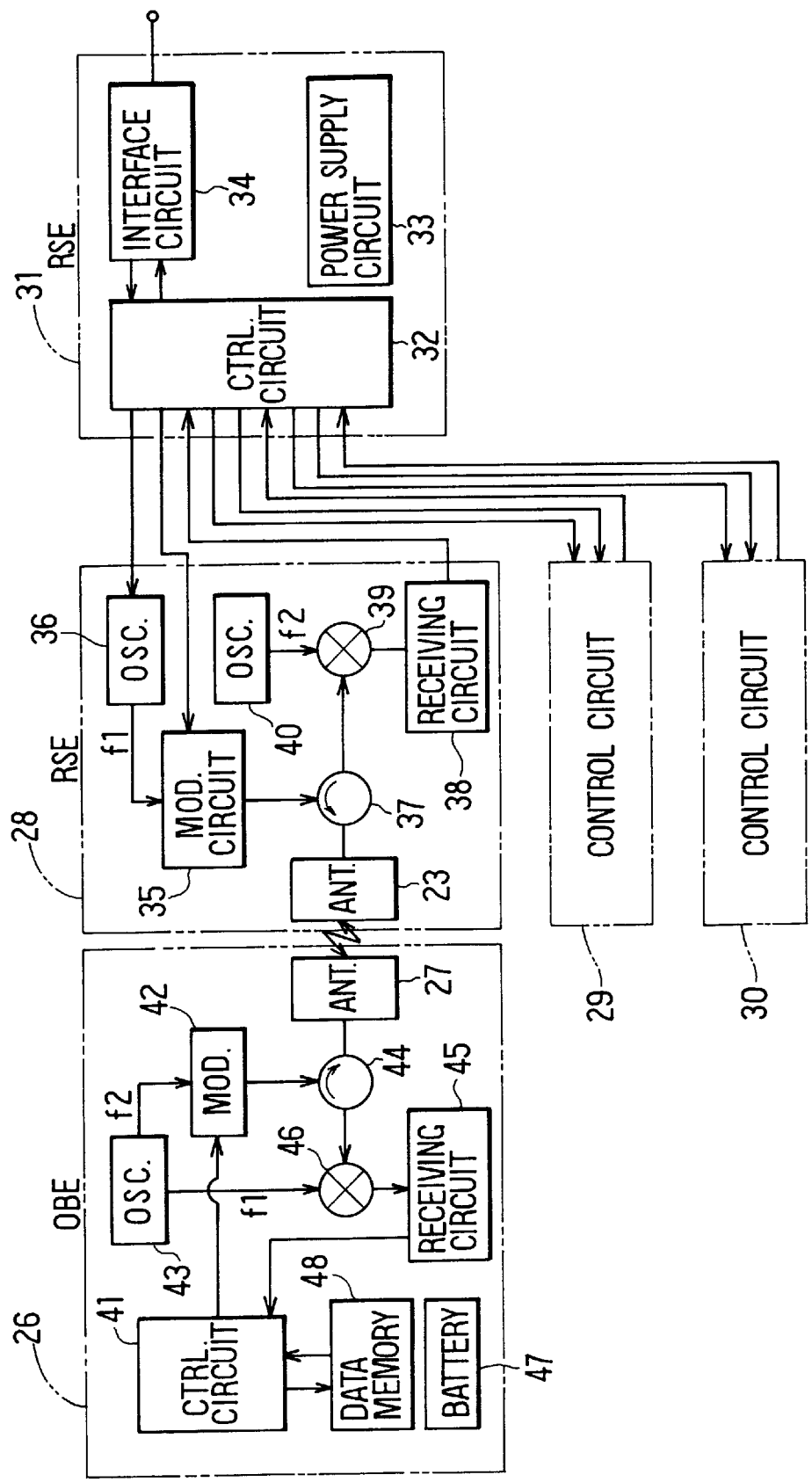
FIG. 2 is an electric wiring diagram of the communication system of the first embodiment shown in FIG. 1.

The electrical circuit of the expressway tollgate system is constructed as shown in FIG. 2 and FIG. 3. At first, the configuration of the antenna unit 16 will be explained on behalf of the antenna units 16 to 18. FIG. 2 shows the overall configuration of the antenna unit 16. Just like the control circuits 29 and 30 of the other antenna elements 24 and 25, the control circuit 28 of the antenna element 23 is connected to a controller 31 that controls all of the antenna elements 23 to 25. The controller 31 is provided with a control circuit 32, a power supply circuit 33, and an interface circuit 34 used to transmit/receive data to/from externally.

In the control circuit 28 including the antenna 23, a modulator circuit 35 modulates as carrier waves the oscillation output of the specified frequency f1 from a transmission oscillator 36 with the signals transmitted from the control circuit 32 and outputs the modulated signals to the antenna element 23 via a circulator 37.

A receiving circuit 38 used to perform signal processing such as demodulation, etc. is connected to a mixer 39. The mixer 39 receives the oscillation output of a specified frequency f2 (different from the transmission frequency f1) set as a receiving frequency from an oscillator 40, as well as communication signals from the antenna element 23 via the circulator 37 corresponding to received signals. After the carrier waves and radio signals corresponding to received signals are mixed in the mixer 39, the mixed signals are supplied to the receiving circuit 38. The receiving circuit 38 demodulates received mixed signals and outputs the demodulated signals to the control circuit 32.

The on-board equipment 26 includes a control circuit 41 which comprises a CPU, a ROM, a RAM, an A/D converter, a D/A converter, a digital demodulator circuit, etc. The control circuit 41 is used to communicate with the antenna units 16 to 18 of the road side equipment by executing specified communication based on a prestored communication program as explained later.

A modulator circuit 42 receives the transmission oscillation output (frequency f2) of an oscillator 43 that can switch the frequency between f1 and f2 as carrier waves and modulates the carrier waves with the signals transmitted from the control circuit 41 and outputs the modulated signals to the antenna 27 via a circulator 44.

A receiving circuit 45 used to demodulate signals is connected to a mixer 46. The mixer 46 receives the receiving oscillation output f1 of the oscillator 43, as well as received signals from the antenna 27 via the circulator 44. The carrier waves and radio signals corresponding to received signals are mixed in the mixer 46. The mixed signals are then output to the receiving circuit 45. The receiving circuit 45 analog-demodulates received signals to received data signal and outputs the received data to the control circuit 41.

The control circuit 41 digital-demodulates analog-demodulated signals from the receiving circuit 45 to digital signals. In this embodiment, analog-demodulated signals are digital-modulated with the Manchester Encoding Method, for example. Thus, original received data is obtained by this digital demodulation. The power of the on-board equipment 26 is supplied to each part from a battery 47. The control circuit 41 controls so that data is stored/read into/from a data memory 48.

A circuit for detecting synchronizing signals from the received data obtained through digital demodulation by the digital demodulator in the control circuit 41 is constructed as shown in FIG. 3. A 32-bit shift register 49 receives data and shifts the bit data sequentially as shown in FIGS. 4A and 4B.

A first comparator 50 receives the higher 16-bit data from the shift register 49. As will be explained later, the first comparator 50 outputs a detection signal when the bit pattern of the 16-bit data matches with the bit pattern of the higher 16-bit data of a first synchronizing signal UW1 (Unique Word 1) whose data length is 32 bits (4 octets). A second comparator 51 receives the lower 16-bit data from the shift register 49. As will be explained later, the second comparator 51 outputs a detection signal when the bit pattern of the 16-bit data matches with the bit pattern of a second synchronizing signal UW2 whose data length is 16 bits (2 octets).

A first AND circuit 52 outputs a detection signal of the synchronizing signal UW1. The two input terminals of the circuit 52 are connected to the output terminals of the first and second comparators 50 and 51, so that when high level detection signals from the comparators 50 and 51 are received, that is, when the received data that matches with the bit pattern of the synchronizing signal UW1, the circuit 52 outputs a detection signal of the synchronizing signal UW1.

A second AND circuit 53 outputs a detection signal of the synchronizing signal UW2. One of the two input terminals of the circuit 53 is connected to the output terminal of the first comparator 50 via an inverter circuit 54 and the other input terminal is connected to the output terminal of the second comparator 51. When a high level detection signal is received from the second comparator 51, that is, when a signal in which the synchronizing signal UW2 bit pattern is detected is received, as well as when a low level detection signal is received, that is, when the data equivalent to the higher 16-bit data bit pattern of the synchronizing signal UW1 is not received, the circuit 53 outputs a detection signal of the synchronizing signal UW2.

A receiving start determination circuit 55 receives detection signals from the first and second AND circuits 52 and 53, as well as control signals from a CPU 56. The circuit 55 outputs the receiving start determination signal to a data register 57 as will be explained later according to the detection signal of the synchronizing signal UW1 or UW2 and the control signal.

The data register 57 receives 8-bit data starting at a specified bit from the shift register 49 in parallel. Receiving the determination signal from the receiving start determination circuit 55, this data register 57 receives subsequent data and outputs the data to the data bus connected to the CPU 56. The CPU 56 then generates and outputs transmission signals through a communication processing according to the data received at a timing defined by the synchronizing signal UW1 or UW2.

In the above configuration, the first and second comparators 50 and 51, the second AND circuit 53, and the inverter circuit 54 provides one detector circuit, while the first and second comparators 50 and 51 and the first AND circuit 52 provides another detector circuit.

Next, the operation of this embodiment will be explained. Before explaining the operation of the first embodiment, the data communication protocol of this embodiment will be explained briefly.

The data communication method adopted in this embodiment uses the DSRC (Dedicated Short-Range Communication) protocol provided for interactive communications between road side equipment and on-board equipment by radio in a limited communication area. This DSRC protocol defines the ETC (Electric Toll Collection) mainly, but the method can also be applied to various ITS (Intelligent Transport System) applications such as CVO (Commercial Vehicle Operation) or interactive navigation, etc.

The DSRC protocol conforms to the ISO/OSI (Open Type System Interaction) standard. However, the configuration must be simplified to end communications within a limited time. Therefore the protocol comprises three layers which are a physical layer (L1), a data link layer (L2), and an application layer (L7). The data link layer (L2) is further divided into the LLC (Logical Link Control) sub-layer and a MAC (Medium Access Control) sub-layer. The application layer (L7) is formed by including L3 to L6 defined in OSI as needed.

The following conditions and methods are required for the data link layer.

(1) Communications must be enabled in a multiple-purpose communication area.

Figure 5A:
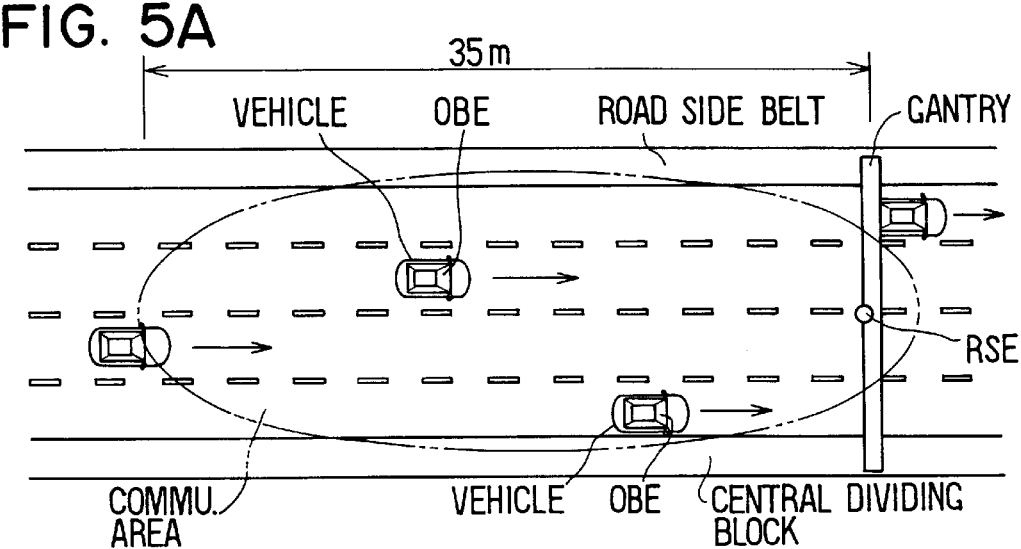
FIGS. 5A to 5C are schematic plan views showing a detailed form of a required communication area.
Figure 5B:
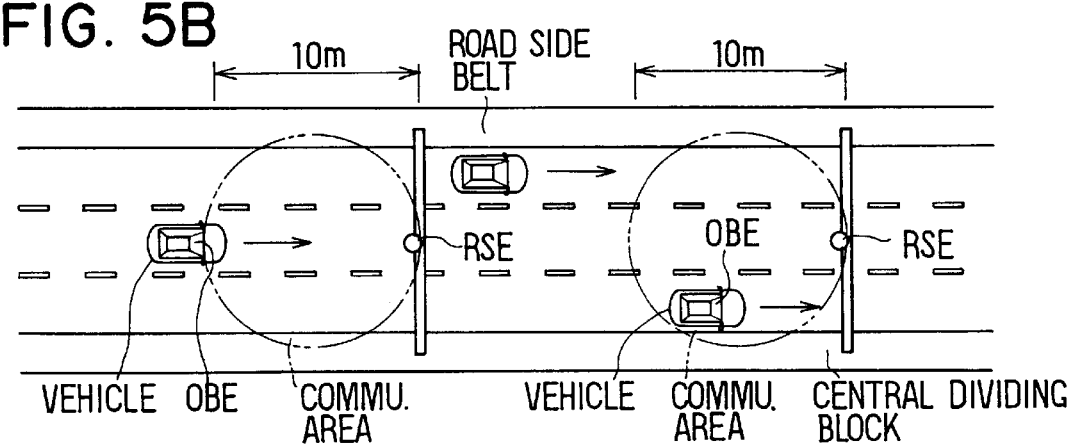
Figure 5C:
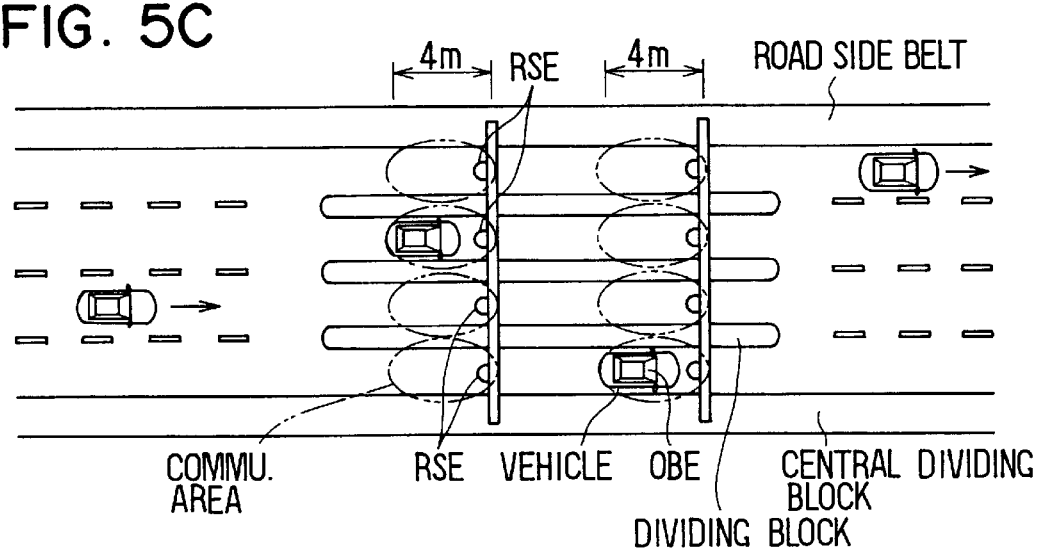

Specifically, communications are enabled with a single protocol within a range of about 3 m (very small communication area at a tollgate) to about 35 m (general communication area of an expressway). FIGS. 5A to 5C show three cases corresponding to those conditions.

FIG. 5A shows a case in which one antenna covers four traffic lanes, for example. The case corresponds to advance information announcement or wide range communication. In this case, the communication area is set in a range of about 35 m expecting that cars are passing at high speeds. FIG. 5B shows another case in which one antenna covers three traffic lanes. Each communication area is set in a range of about 10 m. FIG. 5C shows a further case in which each of the four traffic lanes is delimited by a lane-dividing block and one antenna is provided in each communication area set in a range of about 4 m corresponding to each traffic lane. This case corresponds to a configuration of a tollgate, etc.

(2) Simultaneous communications with a plurality of cars must be enabled.

In order to enable simultaneous communications between the system and a plurality of vehicles, a time-divided multiple access method that uses the slotted aloha system. In this case, it is premised that communications are enabled assuredly even when a vehicle provided with the on-board equipment runs through a narrow communication area at a high speed (for example, the maximum speed is about 180 km when the system is used for a plurality of lanes or about 80 km/h when used for a single lane). Thus, the communication confliction rate among a plurality of vehicles must be controlled low.

(3) Requirements of mass information and high communication reliability must be satisfied.

The information volume of the communication at an ETC exit tollgate beacon is 4.1 k bits at maximum. The information volume of the communication at a general main track beacon for CVO/interactive navigation is 31 k bits at maximum. In addition, the communication reliability must be secured so that the communication error rate of the entire communication system is $1\times10^{-6}$ or under in an ETC when the bit error rate (BER) of a radio line is $1\times10^{-5}$.

(4) The data link layer must be suitable for active communication systems.

The down-link from each road side equipment must enable both half-duplex and full-duplex communications. The up-link from each on-board equipment is basically intended for half-duplex communications, but it also enables full-duplex communications.

This communication protocol, provided to satisfy all of the above requirements, executes communication processing in the following procedure.

In this embodiment, the communication control procedure of the synchronous adaptive slotted aloha system is used as standard. The control procedure is suitable for point-to-point interactive communications between a plurality of moving on-board equipment and a single road side equipment within a short time. Basically, the communication control procedure is intended for half-duplex communications, but the procedure is also defined so as to enable full-duplex communications using different frequencies for up-bound and down-bound lanes like in this embodiment.

Figure 6:
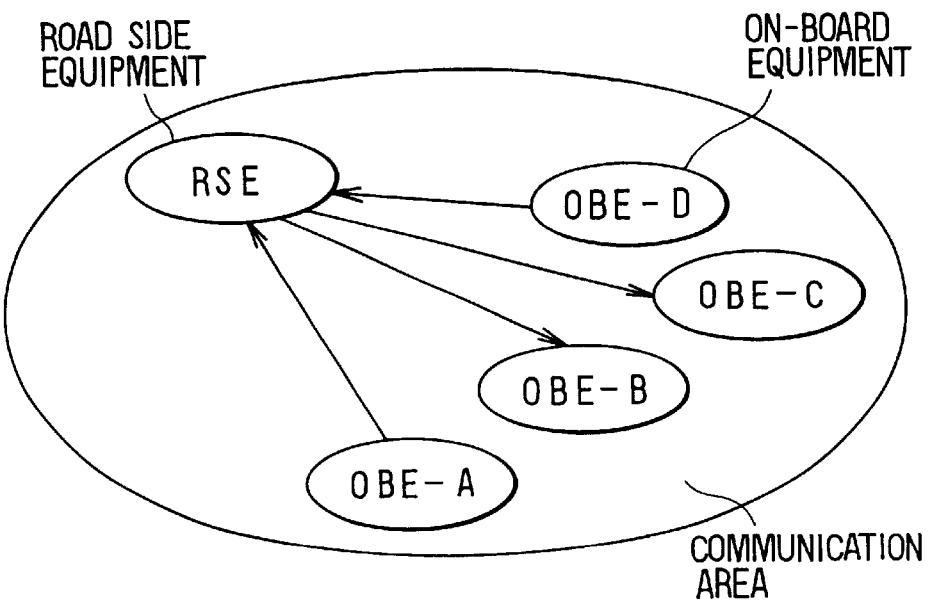
FIG. 6 is a schematic view of the state of the road side equipment communications with a plurality of on-board equipment.
Figure 7:
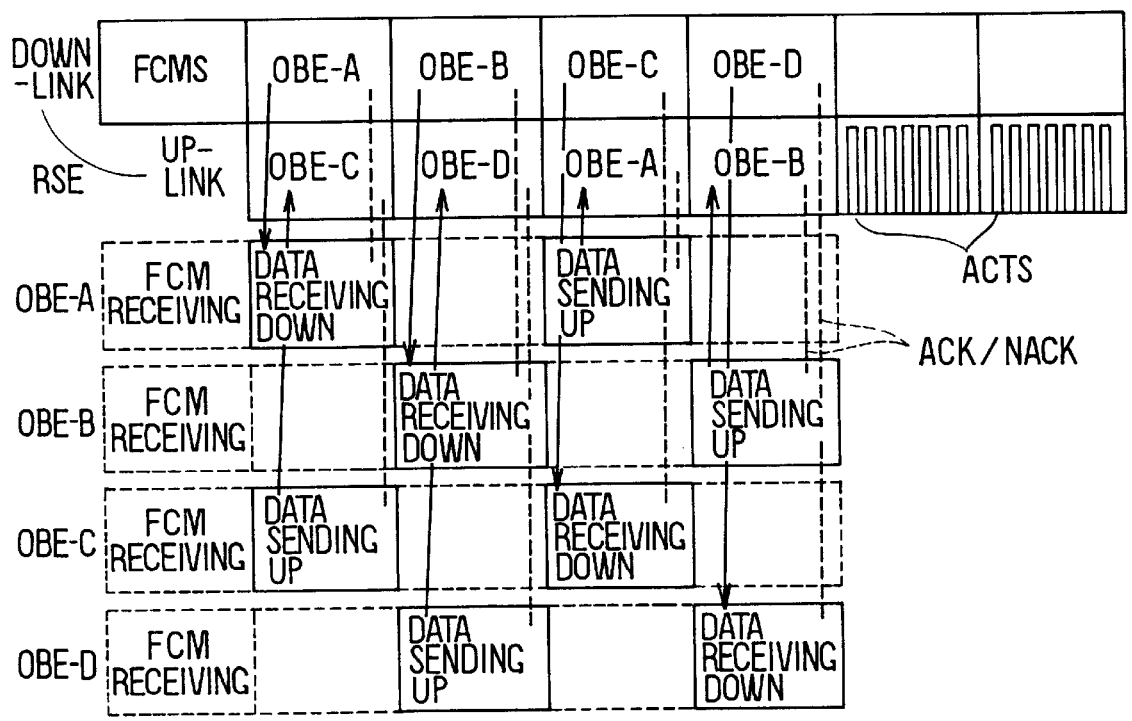
FIG. 7 is a schematic view showing the slot configuration of a communication frame and the state of communications with each on-board equipment.

FIG. 6 shows the concept of an example of the communication state set for satisfying the above requirements. In this case, one road side equipment is used for interactive communications with four on-board equipments, OBE-A, OBE-B, OBE-C, and OBE-D, mounted in four vehicles in its communication area. FIG. 7 shows communications between a communication frame of the synchronous slotted aloha system in the full-duplex mode and four on-board equipment (OBE-A to OBE-D).

Figure 8:
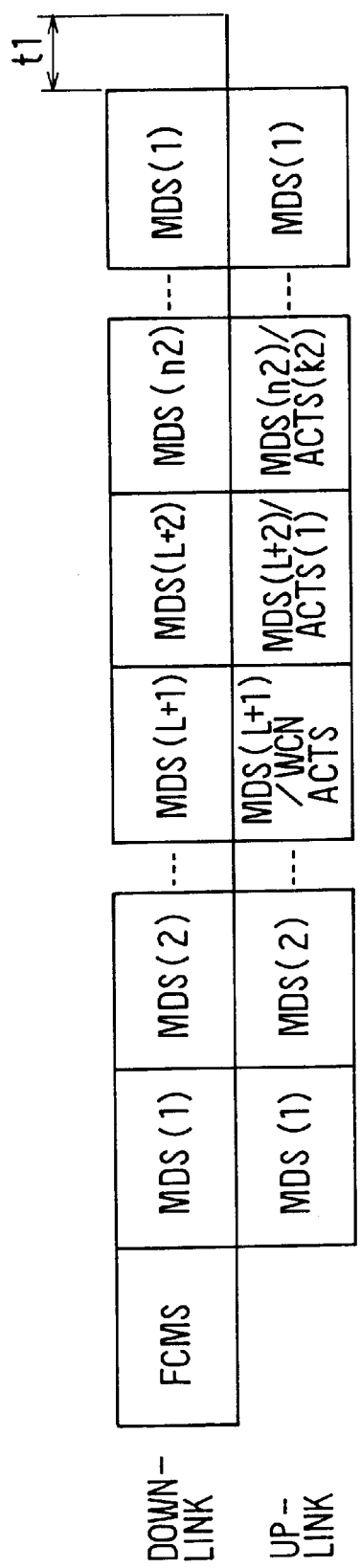
FIG. 8 is a schematic view showing the basic configuration of communication frames.

In this protocol, as shown in FIG. 8, one communication frame comprises three slots (FCMS, MDS, and ACT). In this case, the FCMS (Frame Control Message Slot) is a slot for synchronizing frames and assigning communication slots for each on-board equipment, since each road side equipment controls the communications. The slot must always be positioned at the start of the frame. The MDS (Message Data Slot) is a slot for including actual communication data set so as to follow the FCMS. The slot also includes ACK for data transmission. The slot comprises MDC (Message Data Channel) including communication data and ACKC (ACKnowledge Channel) including ACK. The ACTS (ACTivation Slot) is a slot used by the on-board equipment to issue a communication registration request and is for assigning a plurality of ACTCs (ACTivation Channel) consecutively.

A slot provided in a down-link comprises FCMS and MDS while a slot provided in an up-link comprises MDS and ACTS. By repeating such a frame certain times, one transaction is completed.

Next, the communication procedure used in the above communication case will be explained. FIG. 7 shows a frame configuration for MDS×4 and ACTS×2 in the full-duplex communication mode. The MDS is multiplexed using transmission channels, each of which uses a different frequency for the down-link and for the up-link.

(0) At first, the on-board equipment detects the FCMS signal level sent continuously from the RSE to determine whether or not the object vehicle has entered the communication area A to start up the OBE operation.

(1) The RSE notifies a communication profile such as a frame configuration using an FCMS.

(2) The OBE determines the FCMS content and selects the ACTC from the ACTS at random, then adds a link address to the ACTC to send the link request signal to the road side equipment to request an association.

(3) Then, the OBE sends data to the road side equipment according to the FCMS slot assignment and the RSE sends data through the down-link. The on-board equipment receives data from the OBE through the up-link. At this time, both OBE and RSE send back an ACK using the same slot respectively when ending a data transmission.

As explained above, slots are assigned for the communication between the RSE and each of four OBEs, OBE-A to OBE-D, to eliminate conflictions to ensure communications.

Hereunder, the configuration of the above full-duplex frame will be explained in detail.

(1) FCMS (Frame Control Message Slot)

Figure 9:
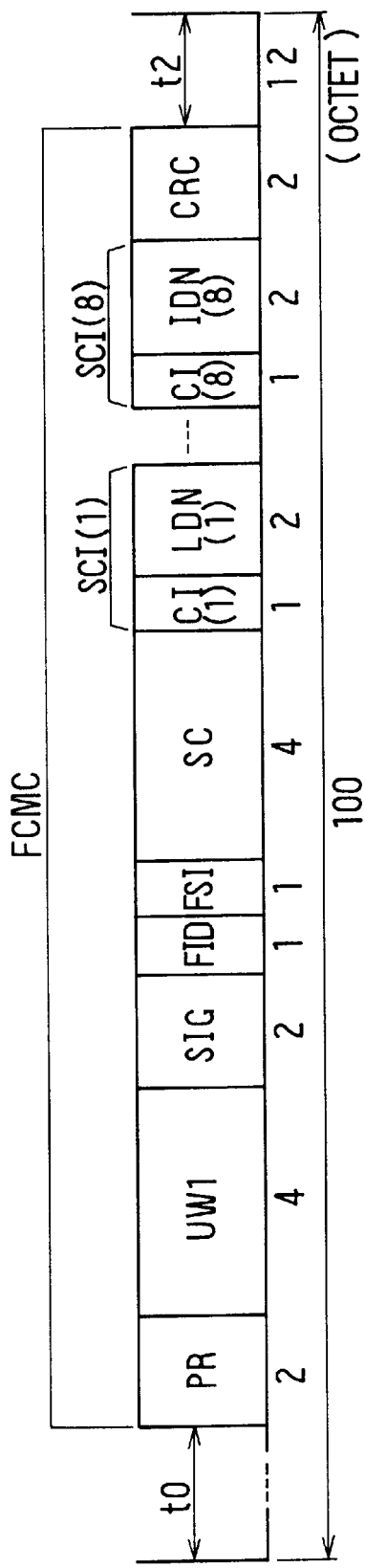
FIG. 9 is a schematic view showing the data configuration of FCMS.

As shown in FIG. 9, this slot comprises an information field SIG (Signaling) of one-octet physical medium layer channel configuration, etc., a one-octet RSE ID number field FID (Fixed Equipment ID), a one-octet frame configuration information field FSI (Frame Structure Information), an RSE service application information field SC (Service Code), and an 8-slot control field SCI (Slot Control Identifier) for communication slot assignment. The SCI, used as MDS assignment information, comprises a one-octet control service field CI (Control Information) and a 2-octet link address sub-field IDN (ID Number).

Each of those signals is provided with a 2-octet preamble signal PR (Preamble), a 4-octet synchronizing signal UW1 (Unique Word), and a 2-octet error check signal CRC (Cyclic Redundancy Check) placed at its head. Then, guard times t0 and t2 are set before and after each of those PR, UW1, and CRC. Thus, the total length of each slot becomes 100 octets.

The unique word UW1 is set as a synchronization flag in general communication systems. It is added so that the on-board equipment OBE that will receive this flag can detect the start of each frame to assume synchronization. For example, a 4-octet, that is, a 32-bit pattern is set as defined below.

UW1=0111 1100 1101 0010 0001 0101 1101 1000

In other words, the higher 16 bits and the lower 16 bits of this UW1 bit pattern are set in the first and second comparators 50 and 51 respectively.

(2) MDS (Message Data Slot)

Figure 10:
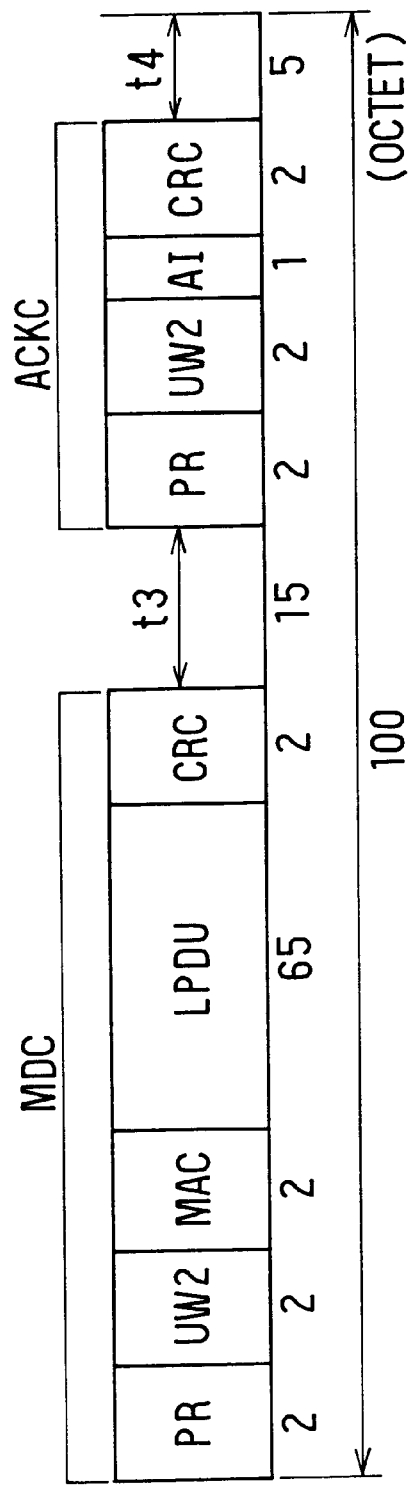
FIG. 10 is a schematic view showing the data configuration of MDS.

As shown in FIG. 10, the MDS comprises a data transmission MDC (Message Data Channel) and an ACKC (ACKnowledge Channel) that notifies the transmitter that signals have been received correctly. Before and after the ACKC are set guard times t3 and t4, so that the total length of the slot becomes 100 octets.

Figure 11:
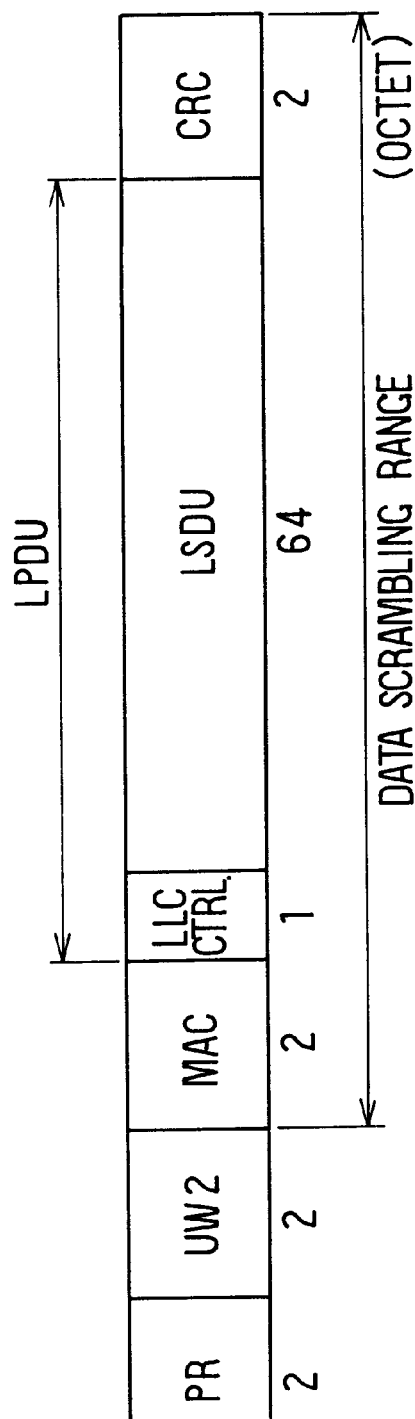
FIG. 11 is a schematic view showing the data configuration of MDC.

Among them, the MDC comprises a 65-octet LPDU (Link Service Data Unit) and a 2-octet MAC control field (MAC) as shown in FIG. 11. The LPDU comprises an LLC control field and an LSDU (Link Service Data Unit). Data in the LPDU, the MAC control field, and the CRC are scrambled. Then, a 2-octet preamble signal PR, a 2-octet synchronizing signal UW2, and a 2-octet error check signal CRC are added to each of those signals, which are transmitted in the physical medium layer.

The unique word UW2 is added to enable the on-board equipment OBE that receives the UW2 to detect the start of each slot so as to be synchronized with the slot. For example, a 2-octet, that is, a 16-bit bit pattern is set as defined below.

UW2=0001 0101 1101 1000

This UW2, as shown in FIG. 4, takes the same bit pattern as that of the lower 16-bit bit pattern of the UW1. In the second comparator 51 is set this UW2 bit pattern.

The ACKC (acknowledge channel) comprises a 1-octet acknowledge information field AI (Activation Information) only. This signal is added a 2-octet preamble signal PR, a 2-octet synchronizing signal UW2, and a 2-octet error check signal CRC and sent in the physical medium layer. The synchronizing signal UW2 is the same synchronizing signal UW2 used for the above MDC.

(3) ACTS (Link Request Slot)

The link request slot comprises a link request slot comprising a link request signal ACT only. Each of the link request slot comprises a plurality of ACTCs. A 2-octet preamble signal PR, a 2-octet synchronizing signal UW2, and a 2-octet error check signal CRC are added to those ACTCs in the same manner as above.

In this embodiment, each antenna unit 16 to 18 used as the RSE is an example corresponding to the configuration shown in FIG. 5C. The communication protocol, as explained above, is formed so as to be able to correspond to the configuration shown in FIG. 5A, as well.

Each antenna unit 16 to 18 sends communication signals to corresponding one of communication areas 19 to 21. In this case, the FCMS is sent at the start of each frame forming the communication signal. This FCMS, as explained above, is added the 32-bit synchronizing signal UW1, which has a long data length. In addition, each communication signal to be sent in communications within each slot assigned by this FCMS is added the 16-bit synchronizing signal UW2 having a short data length.

It is assumed here that a vehicle loaded with the on-board equipment 26 is running on the lane 12 of an expressway 11. When the vehicle approaches the communication area 19 of the antenna unit 16 for passing under the gantry 15, the vehicle receives communication signals sent from the antenna unit 16. The on-board equipment 26 operates so that the communication signals received by the antenna 27 are entered to the mixer 46 via the circulator 44. The signals are then mixed with the oscillation output of the oscillator 43 and the mixed signals are entered to the receiving circuit 45.

The receiving circuit 45 analog-demodulates received communication signals and outputs the demodulated signals to the control circuit 41. The control circuit 41 demodulates the received signals in the digital demodulator not illustrated and outputs the demodulated signals to the shift register 49 sequentially.

As explained above, the synchronizing signal UW1 is added to the start of received data. When the UW1 is entered to the shift register 49, both the first comparator 50 and the second comparator 51 output the detection signal respectively if the bit patterns of the received data in both comparators 50 and 51 match. Consequently, the AND circuit 53 keeps the output of low level signals and the AND circuit 52 outputs the high level detection signals.

Consequently, the receiving start determination circuit 55 detects the synchronizing signal UW1 and outputs the determination signal to the data register 57 so that the CPU 56 receives subsequent data. In addition, this information is also output to the CPU 56, and the CPU 56 processes the data received via the data register 57 according to the information. The CPU 56 then sends modulated communication signals from the antenna 27 via the modulator circuit 42 so as to send a response signal corresponding to the timing of the slot specified by the FCMS obtained at that time.

When there is any data to be received in succession in the frame, the synchronizing signal UW2 added to the start of the received data is detected in the same way to fetch the received data obtained at that detection timing into the CPU 56. In this case, when the bit pattern of the UW2 is entered to the shift register 49, the second comparator 51 outputs the high level detection signal when the received data of UW2 is entered to the lower 16 bits. In addition, at this time, the preamble data is in the higher 16 bits of the shift register 49, so the first comparator 50 outputs the low level signals.

Consequently, the AND circuit 52 provides the low level at this time and the AND circuit 53 outputs the high level detection signal. That is, the data of the synchronizing signal UW2 can be detected immediately when it is entered to the shift register 49. The receiving start determination circuit 55 outputs the determination signal so that the CPU 56 can receive data from the data register 57 when UW2 is detected. Receiving this determination signal, the CPU 57 can process subsequent received data.

When a series of communication processing is thus ended, for example, toll processing such as traffic fee is stored in the data memory 48 of the on-board equipment 26. When traffic information is obtained as data, the information is displayed on a display unit not illustrated to notify the information to a driver.

According to this embodiment, therefore, the bit pattern of the synchronizing signal UW2 is set for the 32-bit synchronizing signal UW1 to be set in the FCMS when the communication is started and in the 16-bit synchronizing signal UW2 to be set in the subsequent MDS so that it becomes the same as that of the 16 bits in the synchronizing signal UW1. Thus, the configuration of the circuit used for identifying and detecting synchronizing signals UW1 and UW2 can be simplified, so that the space for forming the integrated circuit can be saved significantly.

In addition, since the bit pattern of the synchronizing signal UW2 is set so as to match with that of the lower 16 bits in the synchronizing signal UW1, the synchronizing signal UW2 can be determined and detected just when the 16-bit data of the UW2 is entered to the shift register 49. The communication processing can thus be speeded up and completed assuredly within a limited time between the on-board equipment 26 and each antenna unit 16 to 18.

(Second Embodiment)

Figure 12:
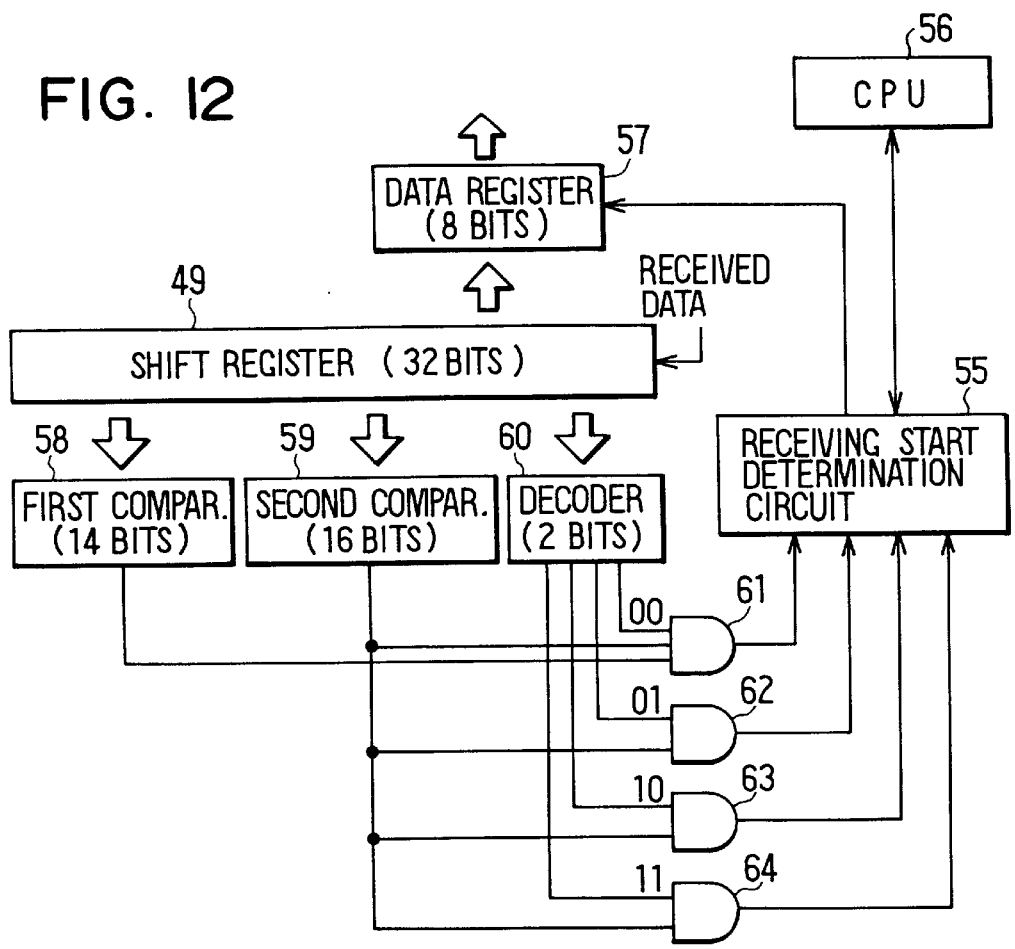
FIG. 12 is an electric wiring diagram of the major part of the second embodiment of the present invention.

FIG. 12 shows the second embodiment of the present invention. Unlike the first embodiment, the bit pattern of the synchronizing signal UW2 is set by shifting 2 bits of the lower 16 bits in the bit pattern of the synchronizing signal UW1 to the higher side.

Figure 13A:
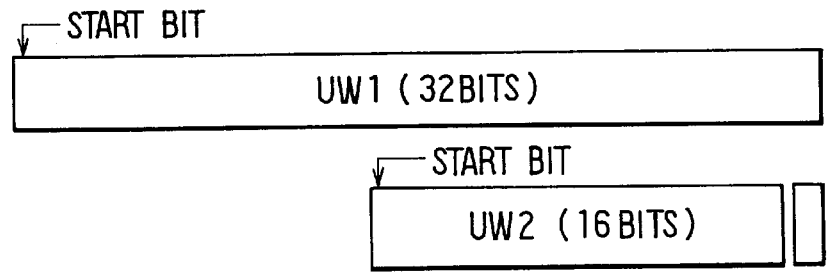
FIGS. 13A and 13B are schematic views showing the correspondence of the bit pattern between two synchronizing signals used in the second embodiment.
Figure 13B:
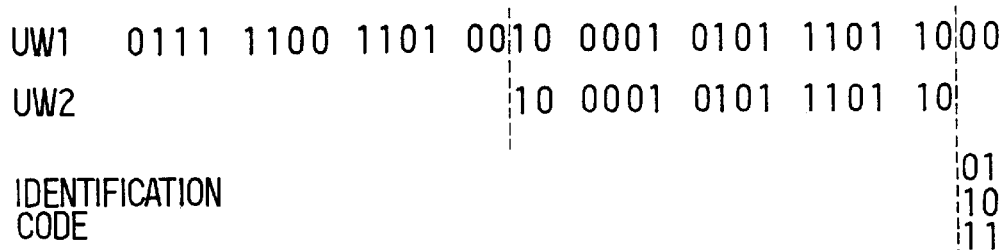

FIGS. 13A and 13B show the bit pattern of the synchronizing signal UW2, which differs from that of the synchronizing signal UW1. The start bit of the synchronizing signal UW2 is taken from the 15th bit of the bit pattern of the synchronizing signal UW1. Then, the subsequent bits up to the 30th bit are adopted for the bit pattern. Furthermore, a 2-bit ID code is added to this synchronizing signal UW2. This ID code is provided as 3 patterns ("01", "10", and "11") so that it can be distinguished from "00" in the lower 2 bits of the synchronizing signal UW1.

Further, although the synchronizing signal UW1 is added to the FCMS, the synchronizing signal UW2 is added to the start of each of a plurality of slots such as MDC, ACK and ACT, etc. To distinguish UW1 from UW2, therefore, it is defined that "01" is added only to the MDC, "10 is added only to the ACK, and "11" is added only to the ACT.

FIG. 12 shows a circuit configuration for determining each of those three ID codes together with the synchronizing signals UW1 and UW2. A first comparator 58 is used to compare 14-bit data. It receives the higher 14-bit data from the shift register 49. A second comparator 59 is used to compare 16-bit data. It receives data between the higher 15th bit and the 30th bit from the shift register 49.

A decoder 60 receives the lower 2-bit data from the shift register 49 and outputs a high level detection signal to the corresponding one of the four output terminals. The second comparator 59 is set so as to detect the bit pattern of the synchronizing signal UW2. The first comparator 58 is set so as to detect the bit pattern of the higher 14 bits of the synchronizing signal UW1.

The output terminal of the first comparator 58 is connected to the input terminal of an AND circuit 61. The output terminal of the second comparator 59 is connected to each input terminal of AND circuits 61 to 64 commonly. The output terminal "00" of the decoder 60 is connected to the input terminal of the AND circuit 61. Each of the output terminals "01", "10", and "11" is connected to the input terminal of each of the AND circuits 62, 63, and 64.

According to the above configuration, when the synchronizing signal UW1 is added to the received data, the first and second comparators 58 and 59 output a high level detection signal respectively and the decoder 60 outputs high level detection signal to the "00" output terminal. Consequently, only the AND circuit 61 outputs the high level detection signal, so that the synchronizing signal UW1 is detected.

When the synchronizing signal UW2 is added to the received data, it is determined whether the subsequent 2-bit ID code is "01", "10", or "11". According to the result, the decoder 60 produces the corresponding outputs. At this time, the first comparator 58 outputs the low level and the second comparator 59 outputs the high level. Thus, according to the ID code value, one of the AND circuits 62 to 64 outputs the high level detection signal consequently, the synchronizing signal UW2 and the ID code added thereto are determined by the receiving start determination circuit 55.

According to the second embodiment, since the ID code is added to the synchronizing signal UW2 to distinguish a slot from others, slots can be identified even when the same synchronizing signal UW2 is added to slots by determining the ID code in advance. Received data can thus be processed fast and erroneous determination which may be caused by noise can be prevented.

(Third Embodiment)

Figure 14:
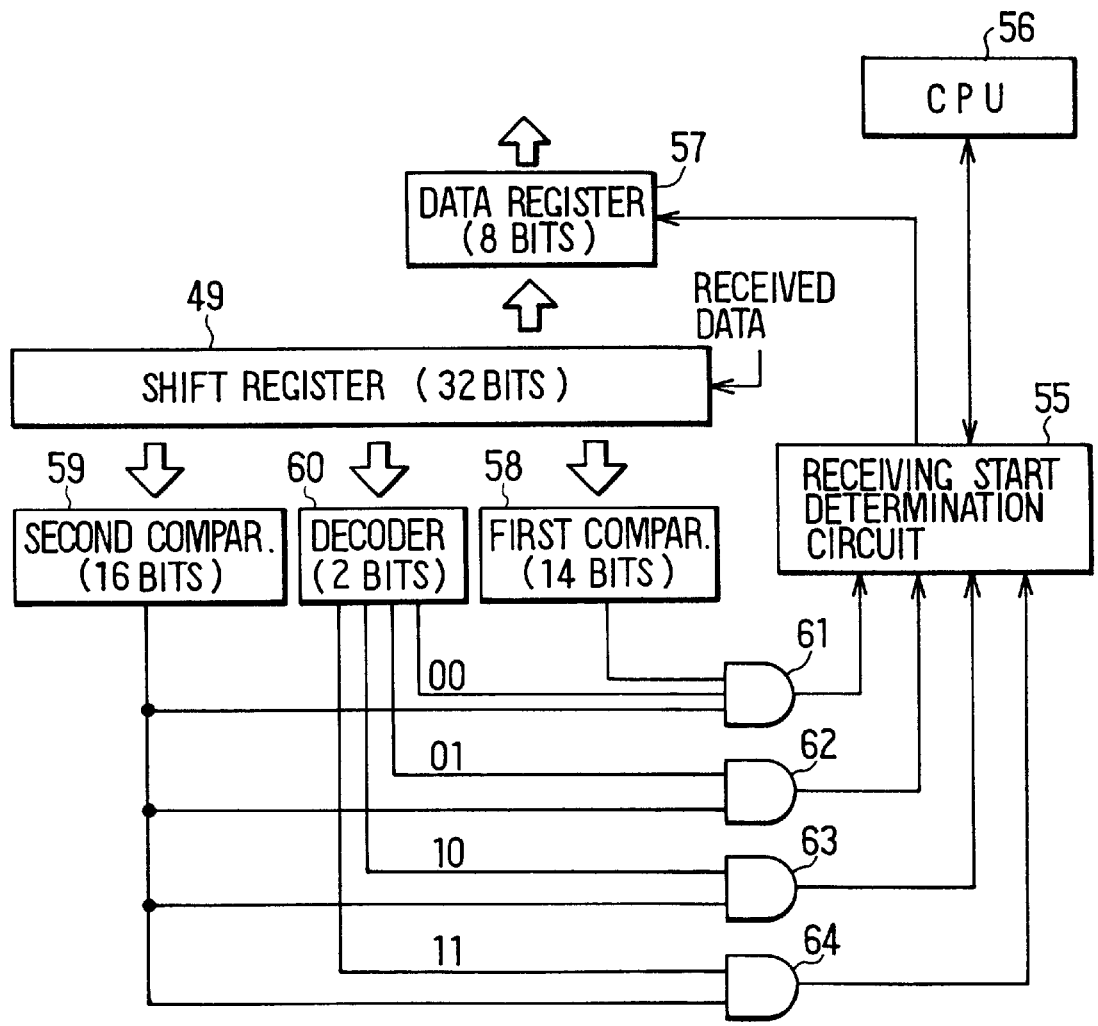
FIG. 14 is an electric wiring diagram of the major part of the third embodiment of the present invention.

FIG. 14 shows the third embodiment of the present invention. There is only a difference from the second embodiment; the same bit pattern as that of the higher 16 bits of the synchronizing signal UW1 is set as the bit pattern of the synchronizing signal UW2. In this third embodiment, since the synchronizing signal UW2 is set thus, the first comparator 58 is set to compare the data of the lower 14 bits from the shift register 49. The second comparator 59 is set to compare the data of the higher 16 bits from the shift register 49. The decoder 60 receives the 17th and 18th bits of the higher data from the shift register 49.

The second comparator 59 is set to detect the bit pattern of the synchronizing signal UW2 just like in the above case. The first comparator 58 is set to detect the bit pattern of the lower 14 bits of the synchronizing signal UW1. The same effect as that of the second embodiment can also be obtained according to this third embodiment.

(Fourth Embodiment)

Figure 15:
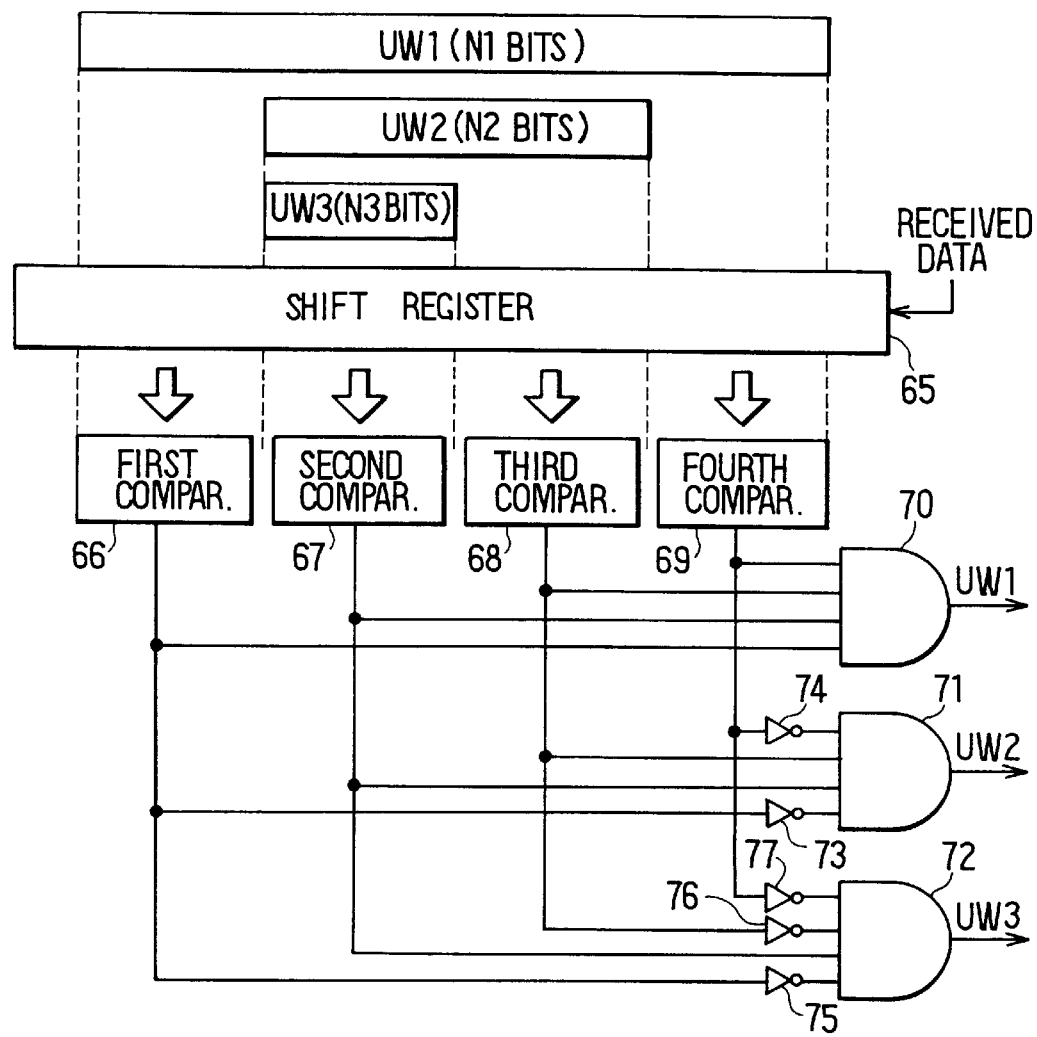
FIG. 15 is an electric wiring diagram of the major part of the fourth embodiment of the present invention.
Figure 16:
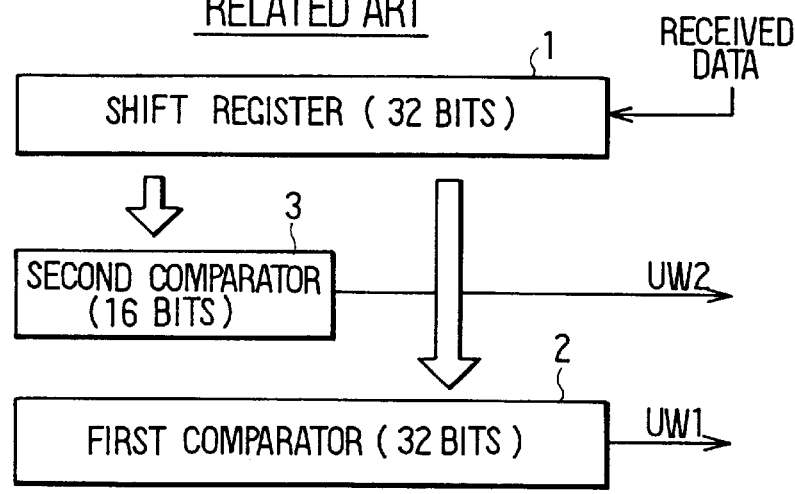
FIG. 16 is an electric wiring diagram showing the major part of a related art.

FIG. 15 shows the fourth embodiment of the present invention. This fourth embodiment has only a difference from the first embodiment; three synchronizing signals UW1, UW2, and UW3 are used. In this embodiment, the synchronizing signal UW1 is set to a data length of N1 bits. The synchronizing signal UW2 is set to a data length of N2 (<N1) bits and its bit pattern is the same as that of the data positioned near the center of the bit pattern of the synchronizing signal UW1. The synchronizing signal UW3 is set to a data length of N3 (<N2) bits and its bit pattern is set to the same one as that of the higher N3 bits of the synchronizing signal UW2.

A shift register 65 receiving the data sequentially is set to a data length of N1 bits or over. Of the data entered to the shift register 65, the N1-bit data existing at a specified position is divided and entered to a first comparator 66, a second comparator 67, a third comparator 68, and a fourth comparator 69 sequentially from the higher bit of the data.

The second comparator 67 is set to receive N3-bit data and detect the bit pattern of the synchronizing signal UW3. The third comparator 68 is set to receive (N2–N3) bits of data and detect the bit pattern of the lower (N2–N3) bits of the synchronizing signal UW2. The first and fourth comparators 66 and 69 are set to receive the specified number of bits of the higher and lower bits of the synchronizing UW1 (total number of (N1–N2) bits) respectively.

AND circuits 70, 71 and 72 are set to output detection signals of the synchronizing signals UW1, UW2, and UW3 respectively. The input terminals of the AND circuit 70 are connected to the output terminal of each of the four comparators 66 to 69 respectively. The input terminals of the AND circuit 71 are connected to the output terminal of each of the comparators 67 and 68, as well as to the output terminals of the comparators 66 and 69 via inverter circuits 73 and 74 respectively. Furthermore, the input terminal of the AND circuit 72 is connected to the output terminal of the comparator 67, as well as to the output terminals of the comparators 66, 68, and 69 via inverter circuits 75 to 77 respectively.

According to the above configuration, when the received data includes synchronizing signals UW1 to UW3, detection signals can be output from the AND circuits 70 to 72 corresponding to UW1 to UW3 respectively. Furthermore, even when the number of types of synchronizing signals, each of which has a data length different from others, is increased thus, the number of bits in the comparator can be set according to the number of bits in the synchronizing signal UW1 having the maximum data length.

The present invention is not limited to the above embodiments, but may be varied and expanded as shown below.

In addition to expressways, the present invention can also be applied to general roads and/or parking lots. It may be applied to another communication system that uses synchronizing signals having a data length different from each other, for example, various types of ITS such as commercial vehicle control CVO or interactive navigation systems. Further, it may be applied not only to wireless communications, but also to wire communications.

Four or more synchronizing signals can also be used. Furthermore, the data length can be set to any number of bits. The number of bits in the shift register can be set freely as long as it is over the number of bits in the synchronizing signal having the maximum data length. The receiving start determination circuit can be provided as needed. The positions of the data bits fetched from the shift register to the data register can be set freely as needed.

It is to be noted that further modifications and alterations are possible without departing from the spirit of the invention.

What is claimed is:

1. A communication system comprising:

on-board communication equipment mounted in a vehicle and used to execute a communication processing according to communication signals received when passing a specified communication area;

wherein the on-board communication equipment includes:

a receiver configured to (i) detect at least two synchronizing signals when receiving the communication signals and (ii) execute a subsequent communication by setting a communication timing according to the detected synchronizing signals; and wherein each synchronizing signal includes a predetermined bit pattern and a predetermined data length defined by a number of bits in the bit pattern, the data length of one of the synchronizing signals being longer than the data length of the other synchronizing signal, and a portion of the bit pattern of the one synchronizing signal having the longer data length matching an entirety of the bit pattern of the other synchronizing signal;

a first detecting circuit in which the bit pattern of a comparator is set so as to detect the synchronizing signal having the shorter data length from among the synchronizing signals; and a second detecting circuit configured for comparing another portion of the bit pattern of the synchronizing signal having the longer data length than that of the detected synchronizing signal, the other portion being undetected by the first detecting circuit, comparing in order to detect the synchronizing signal having the longer data length.

2. A communication system comprising:

on-board communication equipment mounted in a vehicle and used to execute a communication processing according to communication signals received when passing a specified communication area;

wherein the on-board communication equipment includes:

a receiver configured to (i) detect at least two synchronizing signals when receiving the communication signals and (ii) execute a subsequent communication by setting a communication timing according to the detected synchronizing signals; and wherein each synchronizing signal includes a predetermined bit pattern and a predetermined data length defined by a number of bits in the bit pattern, the data length of one of the synchronizing signals being longer than the data length of the other synchronizing signal, and a portion of the bit pattern of the one synchronizing signal having the longer data length matching an entirety of the bit pattern of the other synchronizing signal;

received data storage means for storing the synchronizing signals in a digital form;

a first comparator for comparing a bit pattern of a first plurality of bits of the synchronizing signals stored in the received data storage means with a first reference bit pattern; and a second comparator for comparing a bit pattern of a second plurality of bits of the synchronizing signals stored in the received data storage means with a second reference bit pattern.

3. The communication system as claimed in claim 2, wherein:

the first and second plurality of bits are upper and lower bits of the synchronizing signal having the longer data length;

the received data storage means is a shift register, respectively; and the first and second comparators are connected to upper and lower bit sides of the shift register.

4. The communication system as claimed in claim 3, wherein the receiver further includes:

a receiving start determination circuit for receiving outputs of the comparators indicative of coincidence of both bit patterns to determine a start of receiving subsequent data.

5. A method for data communications comprising:

transmitting and receiving communication signals so as to exchange communication data, the communication signals including at least two synchronizing signals, each synchronizing signal including a predetermined bit pattern and a predetermined data length defined by a number of bits in the bit pattern, wherein (i) the data length of one of the synchronizing signals is longer than the data length of the other synchronizing signal, and (ii) a portion of the bit pattern of the one synchronizing signal having the longer data length matches an entirety of the bit pattern of the other synchronizing signal;

adding an identification bit pattern including a specified number of bits to each of the synchronizing signals; and setting the identification bit pattern of the synchronizing signal having the shorter data length differently from the bit pattern of the synchronizing signal having the longer data length.

6. A method for data communications comprising:

transmitting and receiving communication signals so as to exchange communication data, the communication signals including at least two synchronizing signals, each synchronizing signal including a predetermined bit pattern and a predetermined data length defined by a number of bits in the bit pattern, wherein (i) the data length of one of the synchronizing signals is longer than the data length of the other synchronizing signal, and (ii) a portion of the bit pattern of the one synchronizing signal having the longer data length matches an entirety of the bit pattern of the other synchronizing signal;

wherein the transmitting and receiving further comprise receiving communication signals and detecting the synchronization signals from the received communication signals, and when detecting the synchronizing signal having the longer data length from received communication signals, starting a communication processing according to the detected synchronizing signal and, when detecting the synchronizing signal having the shorter data length, continuing the processing according to the synchronizing signal.

7. A communication system comprising:

on-board communication equipment mounted in a vehicle and used to execute a communication processing according to communication signals received when passing a specified communication area;

wherein the on-board communication equipment includes:

a receiver configured to (i) detect at least two synchronizing signals when receiving the communication signals and (ii) execute a subsequent communication by setting a communication timing according to the detected synchronizing signals; and wherein each synchronizing signal includes a predetermined bit pattern and a predetermined data length defined by a number of bits in the bit pattern, the data length of one of the synchronizing signals being longer than the data length of the other synchronizing signal, and a portion of the bit pattern of the one synchronizing signal having the longer data length matching an entirety of the bit pattern of the other synchronizing signal; and wherein the synchronizing signal has the longer data to indicate a start of a new communication, and the synchronizing signal has the shorter data length to indicate continuation of a communication for sending subsequent data.

8. The communication system as claimed in claim 7, wherein:

each of the communication signals has a plurality of slots; and the synchronizing signals are placed at heads of the slots.

9. A communication system comprising:

on-board communication equipment mounted in a vehicle and used to execute a communication processing according to communication signals received when passing a specified communication area;

wherein the on-board communication equipment includes:

a receiver configured to (i) detect at least two synchronizing signals when receiving the communication signals and (ii) execute a subsequent communication by setting a communication timing according to the detected synchronizing signals; and wherein each synchronizing signal includes a predetermined bit pattern and a predetermined data length defined by a number of bits in the bit pattern, the data length of one of the synchronizing signals being longer than the data length of the other synchronizing signal, and a portion of the bit pattern of the one synchronizing signal having the longer data length matching an entirety of the bit pattern of the other synchronizing signal; and road side communication equipment configured to communicate with the on-board communication equipment by sending communication signals to the specified communication area;

wherein the road side communication equipment includes a transmitter configured to transmit the communication signals to the receiver of the on-board communication equipment; and wherein the transmitter transmits based upon selection of one of the synchronizing signals when starting a communication.

10. A communication system comprising:

on-board communication equipment mounted in a vehicle and used to execute a communication processing according to communication signals received when passing a specified communication area;

wherein the on-board communication equipment includes:

a receiver configured to (i) detect at least two synchronizing signals when receiving the communication signals and (ii) execute a subsequent communication by setting a communication timing according to the detected synchronizing signals; and wherein each synchronizing signal includes a predetermined bit pattern and a predetermined data length defined by a number of bits in the bit pattern, the data length of one of the synchronizing signals being longer than the data length of the other synchronizing signal, and a portion of the bit pattern of the one synchronizing signal having the longer data length matching an entirety of the bit pattern of the other synchronizing signal;

wherein the synchronizing signal having the shorter data length includes identification code bits; and the receiver further has:

received data storage means for storing the synchronizing signals in a digital form;

a first comparator for comparing a bit pattern of a first plurality of bits of the synchronizing signals stored in the received data storage means with a first reference bit pattern;

a second comparator for comparing a bit pattern of a second plurality of bits of the received data storage means with a second reference bit pattern;

a decoder for decoding the identification code; and a receiving start determination circuit for receiving outputs of the comparators and the decoder to determine a start of receiving subsequent data.

11. The communication system as claimed in claim 10, wherein:

the identification code bits are the lowest bits of the synchronizing signal having the shorter data length.

12. The communication system as claimed in claim 10, wherein:
the identification code bits are middle bits of the synchronizing signal having the shorter data length.

13. A method for data communications, the method comprising:
transmitting and receiving communication signals so as to exchange communication data, the communication signals including at least two synchronizing signals, each synchronizing signal including a predetermined bit pattern and a predetermined data length defined by a number of bits in the bit pattern, wherein (i) the data length of one of the synchronizing signals is longer than the data length of the other synchronizing signal, and (ii) a portion of the bit pattern of the one synchronizing signal having the longer data length matches an entirety of the bit pattern of the other synchronizing signal; and
processing subsequent communication data in accordance with the at least two synchronizing signals;
wherein the transmitting and receiving further comprise transmitting the communication signals including the synchronizing signal having the longer data length in order to indicate a start of a new communication, and transmitting the communication signals including the synchronizing signal having the shorter data length in order to indicate continuation of a communication for sending subsequent data.

14. The method for data communications as claimed in claim 13, further comprising configuring the synchronizing signals to have a plurality of bits.

15. The method for data communications as claimed in claim 13, further comprising configuring the synchronizing signals such that a start bit of the synchronizing signal having the shorter data length matches a particular bit of the bit pattern of the synchronizing signal having the longer data length.

16. The method for data communications as claimed in claim 13, further comprising:
providing each communication signal with a plurality of slots; and
placing the synchronizing signals at heads of the slots.

17. A communication system comprising:
on-board communication equipment mounted in a vehicle and used to execute a communication processing according to communication signals received when passing a specified communication area, the on-board communication equipment including:
a receiver configured to (i) detect synchronizing signals when receiving the communication signals and (ii) execute a subsequent communication by setting a communication timing according to the detected synchronizing signals, the receiver further including;
received data storage means for storing the synchronizing signals in a digital form;
a first comparator for comparing a bit pattern of a first plurality of bits of the synchronizing signals stored in the received data storage means with a first reference bit pattern;
a second comparator for comparing a bit pattern of a second plurality of bits of the synchronizing signals stored in the received data storage means with a second reference bit pattern;
a decoder for decoding the identification code; and
a receiving start determination circuit for receiving outputs of the comparators and the decoder to determine a start of receiving subsequent data;
wherein the synchronizing signals include at least two types of bit patterns having a data length different from each other, and a bit pattern of the synchronizing signal having a longer data length includes a bit pattern of the synchronizing signal having a shorter data length; and
wherein the synchronizing signal having the shorter data length includes identification code bits.

18. The communication system as claimed in claim 17, wherein:
the identification code bits are the lowest bits of the synchronizing signal having the shorter data length.

19. The communication system as claimed in claim 17, wherein the identification code bits are middle bits of the synchronizing signal having the shorter data length.

* * * * *